United States Patent
Diwahar et al.

(10) Patent No.: US 11,363,422 B2
(45) Date of Patent: Jun. 14, 2022

(54) METHOD AND NETWORK NODE FOR ENHANCING MESSAGE COMMUNICATION IN A COMMUNICATION NETWORK

(71) Applicant: Telefonaktiebolaget LM Ericsson (publ), Stockholm (SE)

(72) Inventors: A. K. Diwahar, Chennai (IN); Suresh Babu Ambati, Chennai (IN); Savitha Aravindhan, Chennai (IN); R. Kumar, Chennai (IN); Divya Sundar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 194 days.

(21) Appl. No.: 16/628,782

(22) PCT Filed: Jul. 21, 2017

(86) PCT No.: PCT/IN2017/050299
§ 371 (c)(1),
(2) Date: Jan. 6, 2020

(87) PCT Pub. No.: WO2019/016821
PCT Pub. Date: Jan. 24, 2019

(65) Prior Publication Data
US 2020/0204961 A1     Jun. 25, 2020

(51) Int. Cl.
*H04W 4/12*      (2009.01)
*H04L 12/14*     (2006.01)
(Continued)

(52) U.S. Cl.
CPC .......... *H04W 4/12* (2013.01); *H04L 12/1407* (2013.01); *H04L 45/02* (2013.01); *H04L 67/16* (2013.01);
(Continued)

(58) Field of Classification Search
CPC ... H04L 12/1407; H04L 41/022; H04L 45/02; H04L 67/16; H04L 67/34; H04L 69/24; H04W 4/12; H04W 40/248; H04W 84/18
See application file for complete search history.

(56) References Cited

U.S. PATENT DOCUMENTS

| 2012/0207088 A1 | 8/2012 | Liu et al. | |
|---|---|---|---|
| 2013/0198353 A1* | 8/2013 | Hua | H04L 69/40 709/223 |

(Continued)

FOREIGN PATENT DOCUMENTS

| TW | 201246873 A | 11/2012 |
|---|---|---|
| WO | 2016004301 A1 | 1/2016 |

OTHER PUBLICATIONS

European Search Report for European Patent Application No. 17918402.3 dated May 13, 2020.
(Continued)

*Primary Examiner* — Kashif Siddiqui
(74) *Attorney, Agent, or Firm* — Sage Patent Group

(57) ABSTRACT

A network node and method for enhancing message communication between a first network node and a second network node in a communication network is provided. The first network node receives an input message from the second network node wherein the input message contains at least one parameter. The first network node then identifies in the received input message the presence of the at least one parameter, wherein the parameter is unknown to the first network node. After identifying at least one unknown parameter, the first network node sends a request message to the second network node for obtaining meta-data associated with the identified unknown parameter. The first network node then receives a response message from the second network node containing the said obtained meta-data associated with the identified unknown parameter. After receiv- (Continued)

ing the response message, the first network node updates the obtained meta-data associated with the unknown parameter.

20 Claims, 4 Drawing Sheets

(51) Int. Cl.
*H04L 45/02* (2022.01)
*H04L 67/51* (2022.01)
*H04W 40/24* (2009.01)
*H04W 84/18* (2009.01)

(52) U.S. Cl.
CPC ......... *H04W 40/248* (2013.01); *H04W 84/18* (2013.01)

(56) References Cited

U.S. PATENT DOCUMENTS

2017/0187886 A1* 6/2017 Rashid ................. H04W 24/00
2018/0146059 A1* 5/2018 Schoenberg ........ H04L 67/1097

OTHER PUBLICATIONS

International Search Report and Written Opinion of the International Searching Authority for PCT International Application No. PCT/IN2017/050299 dated Sep. 27, 2017.
Fajardo et al., "Diameter Base Protocol," Internet Engineering Task Force (IETF), Request for Comments (RFC) 6733, Oct. 2012, 152 pages.

* cited by examiner

METHOD AND NETWORK NODE FOR ENHANCING MESSAGE COMMUNICATION IN A COMMUNICATION NETWORK

CROSS REFERENCE TO RELATED APPLICATION

This application is a 35 U.S.C. § 371 national stage application of PCT International Application No. PCT/IN2017/050299, filed on Jul. 21, 2017, the disclosure and content of which is incorporated herein by reference in its entirety.

TECHNICAL FIELD

The invention relates to message communication in a communication network. The invention relates to a method and a network node for enhancing message communication between network nodes in a communication network.

BACKGROUND

Diameter Protocol (RFC6733) is an authentication, authorization and accounting protocol framework for computer networks, the protocol is defined in Internet Engineering Task Force (IETF). Diameter Protocol is a base for all diameter applications such as Charging and Policy Control framework etc. Diameter Protocol is a message based protocol, where the types of message supported between the Diameter nodes are of request and response type. Diameter nodes may be network nodes in a network capable of implementing or using a Diameter protocol. A Diameter node in a network could be either a Diameter client or a Diameter server. So, a communication network implementing the Diameter protocol may include one or more Diameter clients that are being served by one or more Diameter server. A Diameter server receives Diameter Request messages from the Diameter clients, and responds to the clients with Diameter Response messages. The communication between two Diameter nodes in a communication network starts with the establishment of a transport connection which is typically through Transmission Control Protocol (TCP) or Stream Control Transmission Protocol (SCTP). The initiator then sends a Capabilities-Exchange-Request (CER) to the other diameter node, which responds with a Capabilities-Exchange-Answer (CEA). The connection is then ready for exchanging communication messages between the Diameter nodes.

Typically in a 3rd Generation Partnership Project (3GPP) network, the network nodes communicate using Diameter protocol. There are several network nodes over diameter network for realizing a communication service. These network nodes may typically comprise of different applications for realizing a service in a communication network. An application to realize a service uses an application context to communicate with another application. These applications are mostly defined by 3GPP. Each of these applications is evolving and results in new releases of standards. As these applications are provided by different vendors, apart from 3GPP defined standard information elements, vendor specific information elements could be also implemented over these applications. The information elements typically provide the format of messages. A message in Diameter protocol may include among other things, a version field, a message length field, a command flag field, a command code field, an application identifier field, a plurality of commands, a plurality of Attribute Value Pairs (AVPs) etc. The various diameter based applications communicates using the Diameter message which contains these information elements. These are usually referred as data. The definition of the structure of an information element is referred to as meta-data In general, to maintain extensibility, for each supported interface for a diameter based application, the network node maintain these standard and the vendor specific information elements in the form of data storage or information containers, which are commonly referred as Diameter Dictionary (here after the Diameter Dictionary will be referred as 'dictionary'). So, the dictionary is typically for data storage which is usually implemented as a data file or a data source. The dictionary contains the definition of the different information elements such as commands, AVPs etc. that are used in the diameter messages sent and received between the diameter peers. This dictionary will be used to validate and accept incoming request or response messages, for the specific diameter application.

Whenever a network node wants to be compliant with updates to the list of standard information elements, which are typically newly added or extended with protocol or interface version updates and/or updates to the list of supported vendor specific information elements;

then the corresponding dictionary shall be updated. All the network nodes in the communication network (here after, will be also referred as Diameter network), which are connected and supports the specific diameter application also needs to update its dictionary, to have the same level of compliance for the application or the service.

Generally, the information elements or interface definitions stored in the dictionary are expected to be static and uniform across network node as there are standard bodies defining them. But the information elements or interface definitions is also flexible to introduce vendor specific parameters, so it can vary with the different vendor applications across various network nodes. The challenge is when a network node is implemented by a vendor and has introduced a vendor specific parameter which needs to be interpreted and acted by another network node which is implemented by another vendor. It would cause incompatibility issues between different network nodes running different versions of the dictionary. It would affect the proper processing and completion of the message communication happening in the Diameter network.

In the existing Diameter networks, generally, these dictionary updates will be handled as an operational activity in the network node. Dictionary updates are typically realized, operationally by means of:

Standalone trigger wherein the dictionaries are updated manually with the newly added meta-data and sequentially implement the updated dictionary in all the network nodes across the diameter network, system-wise in a priority order. This might have impact on service during the update.

Automatic orchestration of dictionary updates wherein an automatic framework is used for updating the dictionary in the affected network nodes across the diameter network, system-wise, among commonly maintained systems in a priority order. This might have impact on service during the update.

However, for the above mentioned update techniques to result in successful dictionary updates, across the Diameter network requires either A well planned and executed flow of dictionary updates across the Diameter network, or A well-defined orchestration framework implementation across the Diameter network If either of the above condition is not satisfied then an asynchronous dictionary update would happen across the Diameter network, it will result in either non-compliant service requirements or not-understandable information exchange between connected network nodes. Also, automatic orchestration method may need standalone triggers for dictionary updates for one or more network nodes in the Diameter network as they are not commonly maintained. By commonly-maintained means different nodes may have different versions, different ways and technique of storing dictionaries in it.

Thus, a traditional dictionary implementation in a network node is limited in how it can address these update issues and typically requires manual intervention. There is a need for enhancing the Diameter message communication in a Diameter network for smooth integration between network nodes supplied by different vendors.

SUMMARY

It is an object of the invention to address at least some of the limitations, problems and issues outlined above. More specifically, it is an object of the invention to provide a method and a network node for enhancing message communication between network nodes in a communication network.

These and other objects of the invention are achieved by means of different aspects of the invention, as defined by the independent claims. Embodiments of the invention are characterized by the dependent claims.

According to a first aspect of the invention, a method for enhancing message communication between a first network node and a second network node in a communication network is provided. The method which is being executed at the first network node comprises the steps as stated. The first network node receives an input message from the second network node wherein the input message contains at least one parameter. The first network node then identifies in the received input message the presence of the at least one parameter, wherein the parameter is unknown to the first network node. After identifying at least one unknown parameter, the first network node sends a request message to the second network node for obtaining meta-data associated with the identified unknown parameter. The first network node then receives a response message from the second network node containing the said meta-data associated with the identified unknown parameter. After receiving the response message, the first network node updates the obtained meta-data associated with the unknown parameter.

The method step of sending the request message from the first network node to the second network node is executed upon determining a status of a learning capability associated with the first network node and the second network node. The sending of the request message is carried out when it has been determined that the status of the learning capability is enabled for both the first network node and the second network node.

The parameter contained in the input message may further comprise a parameter identifier for identifying the parameter with a unique value; and a parameter data.

The method step of identifying the presence of at least one unknown parameter may further comprise the step of verifying that the parameter identifier of the parameter contained in the received input message is not present in any data storage of the first network node.

The request message sent from the first network node to the second network node may further comprise the parameter identifier of the identified unknown parameter; and a unique request message identifier for identifying the request message type.

The response message received at the first network node from the second network node may further comprise the parameter identifier of the identified unknown parameter, the obtained meta-data associated with the identified unknown parameter contained in the request message; and a unique response message identifier, for identifying the response message type.

The method step of updating the obtained meta-data associated with the unknown parameter may further comprise the step of identifying the response message identifier. Then, identifying the parameter identifier and the obtained meta-data associated with the identified unknown parameter contained in the received response message. After identifying the obtained meta-data associated with the identified the unknown parameter, it is then updated in the in a data storage of the first network node.

The message communication between the first network node and the second network node in the communication network as per the above method is via a diameter protocol.

The advantage of this method is that it enables any network node in a communication network to dynamically learn the meta-data whenever it encounters an unknown parameter during message communication and automatically update its corresponding data storage without any manual intervention. This process of dynamic learning performed by the network node to automatically update the data storage helps in reducing the errors, time, outages etc. when it is updated manually. The dynamic learning also aids to improve the overhead delay caused in identifying and processing the messages in any network node of the communication network. This process of automatically updating the data storage of a network node also benefits in reducing the lead time during activities such as integration, launching of new, introducing new protocol releases etc. The method enables smooth integration between network nodes supplied by different vendors in a communication network.

According to second aspect of the invention, a first network node is provided for enhancing message communication with a second network node in a communication network. The first network node comprises a communication interface which is for communicating with the second network node in the communication network; a data storage; and a network controller. The network controller of the first network node is configured to receive an input message from the second network node wherein the input message contains at least one parameter. It then identifies in the received input message from the second network node the presence of at least one parameter, wherein the parameter is unknown to the first network node. After identifying the unknown parameter, it then sends a request message to the second network node for obtaining meta-data associated with the identified unknown parameter. Then it receives a response message from the second network node containing the said meta-data associated with the identified unknown parameter. After receiving the response message, it then updates the obtained meta-data associated with the unknown parameter According to third aspect of the invention, a method for enhancing message communication between a first network node and a second network node in a communication network is provided. The method which is being executed at the second network node comprises the steps as stated. The second network node transmits an input message to the first network node wherein the input message contains at least one parameter. The second network node then receives a request message from the first network node requesting meta-data associated with the parameter, wherein the parameter is unknown to the first network node. The second network node then transmits a response message to the first network node wherein, the response message contains the said requested meta-data associated with the parameter.

According to fourth aspect of the invention, a system for enhancing message communication between a first network node and a second network node in a communication network is provided. The system is configured to perform the steps as stated. The second network node transmits an input message to the first network node wherein the input message contains at least one parameter. The first network node then identifies in the received input message the presence of the at least one parameter, wherein the parameter is unknown to the first network node. After identifying at least one unknown parameter, the first network node sends a request message to the second network node for obtaining meta-data associated with the identified unknown parameter. The second network node then transmits a response message to the first network node wherein, the response message contains the said requested meta-data associated with the parameter. After receiving the response message from the second network node, the first network node updates the obtained meta-data associated with the unknown parameter.

According to fifth aspect of the invention, a computer program for enhancing message communication between a first network node and a second network node in a communication network is provided. The computer program comprises computer-executable instructions which when executed on the first network node, causes the first network node to receive an input message from the second network node wherein the input message contains at least one parameter. The first network node then identifies in the received input message the presence of the at least one parameter, wherein the parameter is unknown to the first network node. After identifying at least one unknown parameter, the first network node then sends a request message to the second network node for obtaining meta-data associated with the identified unknown parameter. The first network node then receives a response message from the second network node containing the said obtained meta-data associated with the identified unknown parameter. After receiving the response message, the first network node updates the obtained meta-data associated with the unknown parameter.

According to sixth aspect of the invention a computer program product which is provided comprising an embodiment of a computer program according to the fifth aspect and a computer readable means on which the computer program is stored.

BRIEF DESCRIPTION OF THE DRAWINGS

The invention will now be described in more detail by means of some example embodiments and with reference to the accompanying drawings, in which.

DETAILED DESCRIPTION

The invention will now be described more fully hereinafter with reference to the accompanying drawings, in which certain embodiments of the invention are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
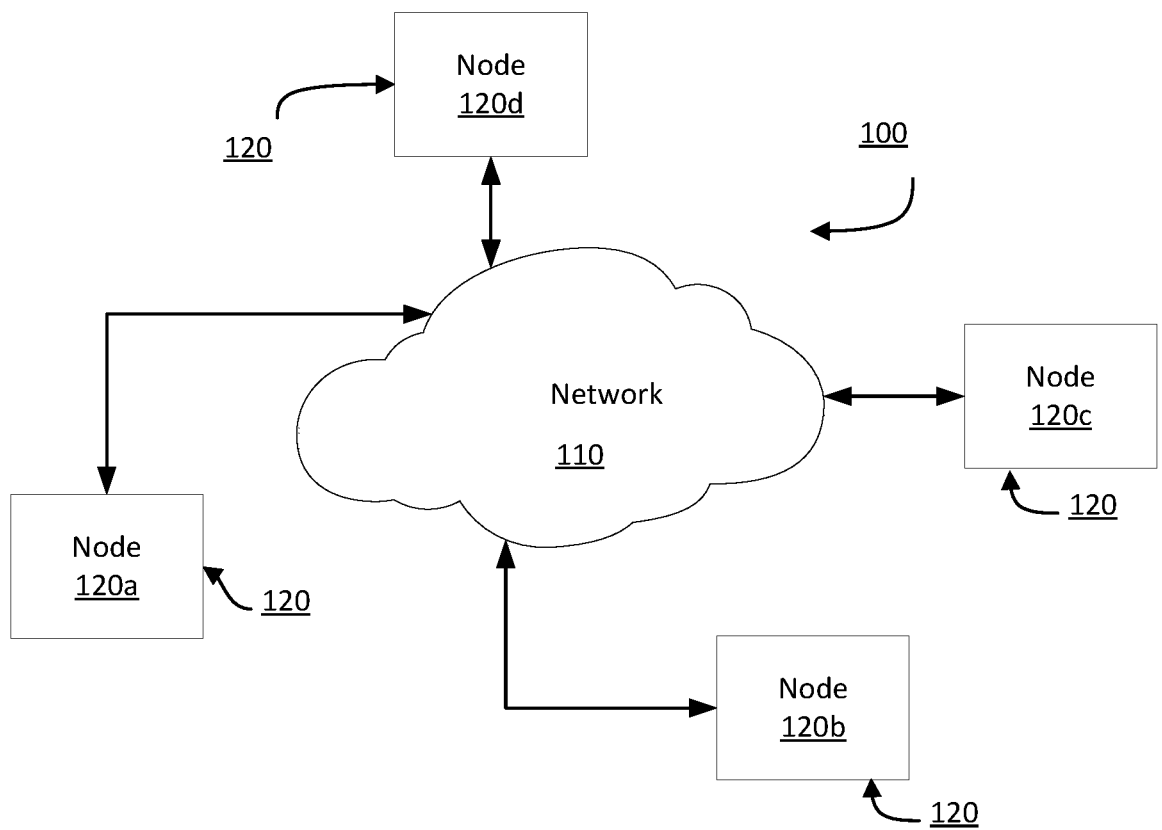
FIG. 1 is a schematic block diagram of an environment where the embodiments presented herein may be applied.

FIG. 1 shows a schematic block diagram of an environment 100 where embodiments of the invention presented herein may be applied. The environment 100 shows a communication network 110. The environment 100 comprises network nodes 120a, 120b, 120c, 120d etc. which communicates with each other. Herein after numerals 120a, 120b, 120c, 120d etc. would be used for specifically denoting a particular network node, while numeral 120 would be used for denoting the network nodes in general. The object of the invention is to enhance the message communication between network nodes 120 in the communication network 110. The network nodes 120 represented may be different applications provided by different vendors for performing different functionalities. Examples of network nodes 120 may include a policy engine, a policy server, an Internet protocol (IP) multimedia subsystem (IMS) network node, a server, a node, a database, a computing platform etc. The network nodes are connected optionally to each other via a communication network 110. The network 110 can be a local area network (LAN) or a wide area network (WAN) such as the Internet. The connection between the network nodes 120 and the network 110 can be wireless or wire based. The wired connection can for example be a local area network connection such as an Ethernet connection, and/or a local connection such as a USB (Universal Serial Bus) connection or Fire Wire connection. The wired connection can also comprise a connection between a facility and an Internet service provider, e.g. using DSL (Digital Subscriber Line), coaxial cable (also used for cable television) and/or an optical fibre.

The environment 100 shown in FIG. 1 is suitable for implementing and executing the current invention for enhancing the communication between network nodes 120 in the communication network 110, will be explained in more detail below.

The network nodes 120 as illustrated in FIG. 1 may be capable of implementing or using a Diameter protocol. All the message communication between the network nodes 120 in the communication network 110 may be typically via a Diameter protocol. As shown, there could be several diameter network nodes 120 over the network 110 for realizing a communication service. These diameter network nodes 120 may typically comprise of different applications which could be provided by different vendors. For example, a network node 120a may need to interact with multiple network nodes (120b, 120c and 120d) in the network 110, many of which could be from various vendors. So, the commands and AVPs that are used in the diameter messages sent and received between the network node 120a and the multiple network nodes (120b, 120c and 120d) may have definitions which could be standard specific or vendor specific. These information element definitions are stored in a data storage or data dictionary (here after the data storage or data dictionary would be referred as 'dictionary') of each network node (120a, 120b, 120c and 120d).

If a first network node 120 (here exemplified with network node 120a) needs to interface with second network node 120 (here exemplified with network node 120b) in the network 110, then the first network node 120a must have all the standard and vendor specific information element definitions in its dictionary for it to accept and process the Diameter messages that are sent by the second network node 120b and vice-versa. The Diameter messages that are sent between the first network node 120a, and the second network 120b in the communication network 110 may comprise multiple AVPs for which the corresponding dictionary in the first 120a and second 120b network nodes contains the definition of AVP such as name, description, type etc. which constitutes the meta-data. When the first network node 120a sends a request towards the second network node 120b with an unknown AVP, the second network node 120b can either reject the request completely or process the request partially by omitting this unknown AVP. An unknown AVP means the definition or meta-data of the AVP is not available in the dictionary of the pertaining receiving network node 120; here it refers to second network node 120b. When such unknown AVPs need to be included and made available for the complete processing of the request, the dictionary of the second network node 120b needs to be updated with the meta-data of the corresponding unknown AVPs. Currently, the process of updating these dictionaries is done manually by loading them in the dictionary of the network nodes 120 in the communication network 110. This process of updating the dictionaries results in manual intervention errors, overhead delay in identifying and processing the diameter messages in diameter network. Today, there is no mechanism available to dynamically learn about the unknown AVP definitions present in the diameter message and automatically update the corresponding dictionary of the network node 120 accordingly.

Figure 2:
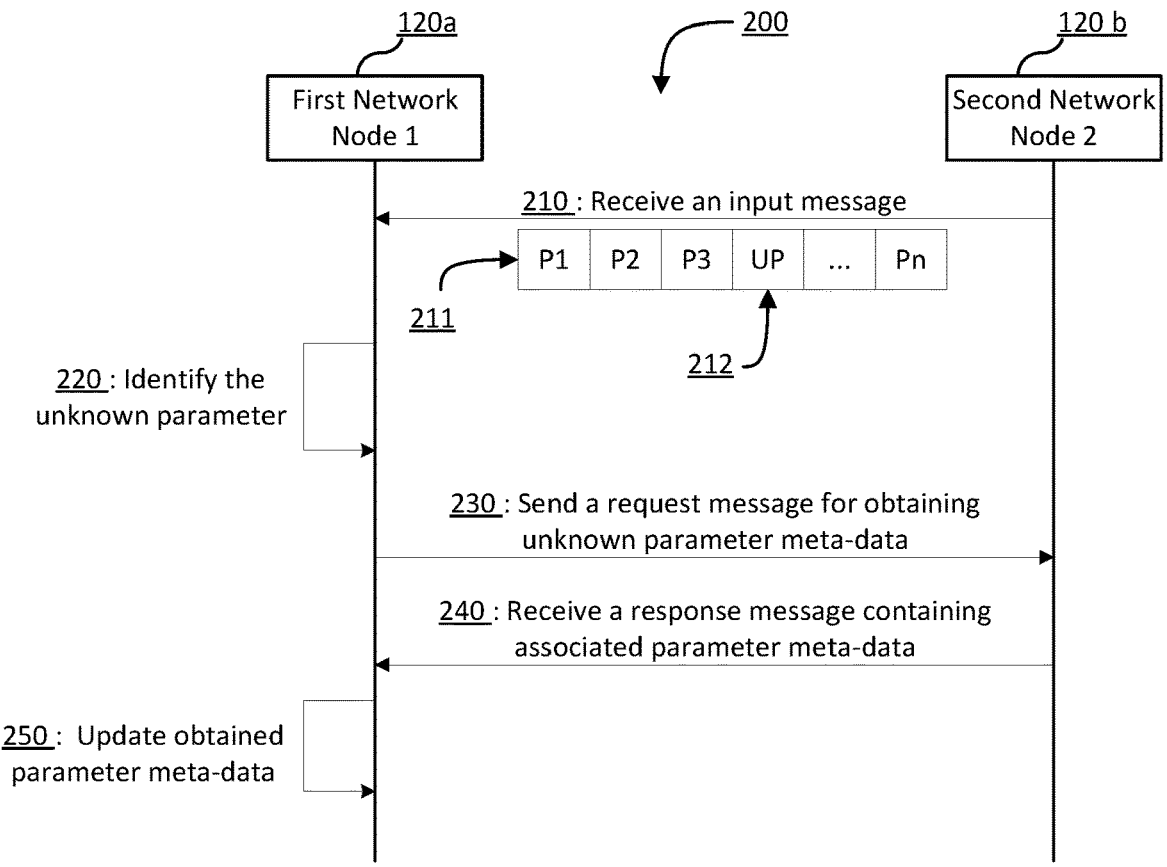
FIG. 2 is a schematic sequence diagram of a method for enhancing the message communication in a communication network with regard to the first network node in accordance to an embodiment of the invention.

In FIG. 2, a schematic sequence diagram of a method 200 for enhancing the message communication in a communication network 110 with regard to the steps executed in the first network node 120a in accordance to an embodiment of the invention is illustrated. The method 200 implements the communication network 110, the first network node 120a and the second network node 120b described above with reference to FIG. 1

The method in FIG. 2 comprises the steps of the first network node 120a receiving 210 an input message from the second network node 120b wherein the input message contains at least one parameter 211. The method further comprises, the first network node 120a identifying 220 in the received input message the presence of at least one parameter 211, wherein the parameter 212 is unknown to the first network node 120a. After identifying at least one unknown parameter 212, the method further comprises, the first network node 120a sending 230 a request message to the second network node 120b for obtaining meta-data associated with the identified unknown parameter 212. The method further comprises the first network node 120a then receiving 240 a response message from the second network node 120b containing the said meta-data associated with the identified unknown parameter 212. After receiving the response message, the method further comprises, the first network node 120a updating 250 the obtained meta-data associated with the unknown parameter 212.

Each step of the method 200 shown in FIG. 2 will now be discussed in more detail. The method process starts at step 210, when the first network node 120a receives an input message from the second network node 120b. The input message received at the first network node 120a must contain at least one parameter 211. P1, P2, P3, UP . . . Pn 211 denotes the parameters contained in the input message. The input message received may contain one or more parameters 211. The parameter 211 contained in the input message may comprise a parameter identifier and a parameter data. The parameter identifier associated with a parameter 211 is used for identifying the parameter 211 with a unique value across the different network nodes 120 in the network 110. The parameter data associated with a parameter 211 could be used by either or both of the first 120a and second 120b network node, for processing the messages sent to or received at the two network nodes 120a, 120b.

After receiving the input message from the second network node 120b, the first network node 120a processes the input message to identify the parameters 211 contained in it. At step 220, the first network node 120a identifies in the received input message the presence of at least one parameter 211, wherein the parameter 212 is unknown to the first network node 120a. The method step of identifying the presence of at least one parameter 211 further comprises the process of verifying that the parameter identifier of the parameter 211 contained in the received input message is not present in any data storage of the first network node 120a. UP 212 denotes the unknown parameter in the input message.

After identifying the unknown parameter 212, the first network node 120a then performs the step 230. At step 230, the first network node 120a sends a request message to the second network node 120b for obtaining the meta-data associated with the identified unknown parameter 212. The first network node 120a sends a request message to the second network node 120b upon determining a status of a learning capability associated with the first network node 120a and the second network node 120b. The method step of sending the request message is carried out by the first network node 120a when it has been determined that the status of the learning capability is enabled for both the first network node 120a and the second network node 120b.

The learning capability status of a network node 120a, 120b is typically set as Boolean value of true or false i.e. enabled or disabled state. It denotes whether the network node 120a, 120b supports the aspect of dynamic learning. The learning capability status value for a network node 120a, 120b would be set either manually or automatically as per the specifications defined by the vendor providing the network node.

When the first network node 120a identifies an unknown parameter 212 in the input message received from the second network node 120b then the first network node 120a can reject the input message completely; or process the input message partially by omitting this unknown parameter 212; or try to obtain i.e. learn the meta-data associated with the unknown parameter 212 for processing the input message. The process of rejecting the input message or partially processing by omitting the unknown parameter 212 or learning the meta-data is done based on the learning capability status of the first network node 120a. Since the input message is received from the second network node 120b, typically the second network node 120b would be having the meta-data associated with the identified unknown parameters 212. So, when the second network node 120b receives a request message from the first network node 120a for obtaining the meta-data associated with the identified unknown parameter 212, then the second network node 120b would either ignore the request message, not provide the requested meta-data; or process the request message, provide the requested meta-data to the first network node 120a. The process of ignoring the request or providing the requested meta-data is done based on the learning capability status of the second network node 120b. The table given below shows what process is performed by the first 120a and second network node 120b based on the status of the learning capability.

| Learning Capability Status of First Network Node | Learning Capability Status of Second Network Node | Process performed by First Network Node | Process performed by Second Network Node |
|---|---|---|---|
| Enabled | Enabled | Learn, send request to obtain the meta-data | Process, provide the requested meta-data |
| Enabled | Disabled | Reject input message or partially process by omitting | Ignore, not provide the meta-data |
| Disabled | Enabled | Reject input message or partially process by omitting | Ignore, not provide the meta-data |
| Disabled | Disabled | Reject input message or partially process by omitting | Ignore, not provide the meta-data |

The request message sent from the first network node 120a to the second network node 120b may comprise the parameter identifier of the identified unknown parameter 212 and a unique request message identifier. The request message may comprise of a single parameter identifier associated with a single unknown parameter 212 or a list parameter identifiers associated with a list of unknown parameters 212. The request message identifier is used for uniquely identifying the request message type. When the second network node 120b receives the request message, the request message identifier helps the second network node 120b in identifying that the first network node 120a has sent a request for obtaining the meta-data associated with certain parameter(s) 211 whose corresponding parameter identifier is provided with the request message.

After sending the request message, the first network node 120a performs the step 240. At step 240, the first network node 120a receives a response message from the second network node 120b. The response message contains the meta-data associated with the identified unknown parameter 212. The first network node 120a receives the response message from the second network node 120b based on the request message sent to the second network node 120b in the previous step 230. Thus, the first network node 120a obtains the meta-data associated with the unknown parameter 212 from the second network node 120b through the response message.

The response message received from the second network node 120b at the first network node 120a may comprise the parameter identifier and the meta-data associated with the identified unknown parameter(s) 212 which was contained in the request message sent to the second network node 120b from the first network node 120a in the previous step 230; and a unique response message identifier. The response message may comprise a single parameter identifier associated with a single unknown parameter 212 and its corresponding meta-data or a list of parameter identifiers associated with a list of unknown parameters 212 and its corresponding meta-data. The response message identifier is used for uniquely identifying the response message type. When the first network node 120a receives the response message, the response message identifier helps the first network node 120a in identifying that the second network node 120b has sent a response containing the meta-data associated with the identified unknown parameter 212 whose corresponding parameter identifier(s) was provided with the request message sent to the second network node 120b from the first network node 120a in the previous step 230.

After receiving the response message from the second network node 120b, the first network node 120a performs the step 250. At step 250, the first network node 120a updates the meta-data associated with the unknown parameter(s) 212 which is obtained from the second network node 120b through the response message received at the first network node 120a from the second network node 120b. The method step of updating the obtained meta-data associated with the unknown parameter 212 further comprises the process of identifying the response message identifier, then identifying the parameter identifier and the obtained meta-data associated with the identified unknown parameter 212 contained in the received response message; and updating the obtained meta-data associated with the identified unknown parameter(s) 212 in a data storage of the first network node 120a. So, after the updating the obtained meta-data associated with the identified unknown parameter(s) 212 in the data storage, the first network node 120a would be capable of processing any input message containing these unknown parameter(s) 212 in the future.

The message communication between the first network node 120a and the second network node 120b in the communication network 110 for performing the method 200 is typically via a diameter protocol.

The advantage of this method is that it enables any network node 120a, 120b in the network 110 to dynamically learn the meta-data whenever it encounters an unknown parameter 212 during message communication and automatically update its corresponding data storage without any manual intervention. This process of dynamic learning performed by the network node 120a, 120b to automatically update the data storage helps in reducing the errors, time, outages etc. when it is updated manually. The dynamic learning also aids to improve the overhead delay caused in identifying and processing the messages in any network node 120a, 120b of the network 110. This process of automatically updating the data storage of a network node 120a, 120b also benefits in reducing the lead time during activities such as:

Integration—When a new network node 120 is introduced in the communication network 110 by a different vendor, the vendor specific parameters meta-data could be added automatically without any manual intervention and smoothly integrated without any downtime Launching of new services—Whenever a new feature is introduced in a network node by addition of new parameters 211, then these new parameters 211 would reflect automatically in other nodes 120 in the communication network 110, so that the application can make use of the new parameters 211.

Introducing new protocol releases—Whenever a new release of standard protocol is upgraded in one of the network node 120 it would automatically get reflected in the other connected nodes in the communication network 110.

Figure 3:
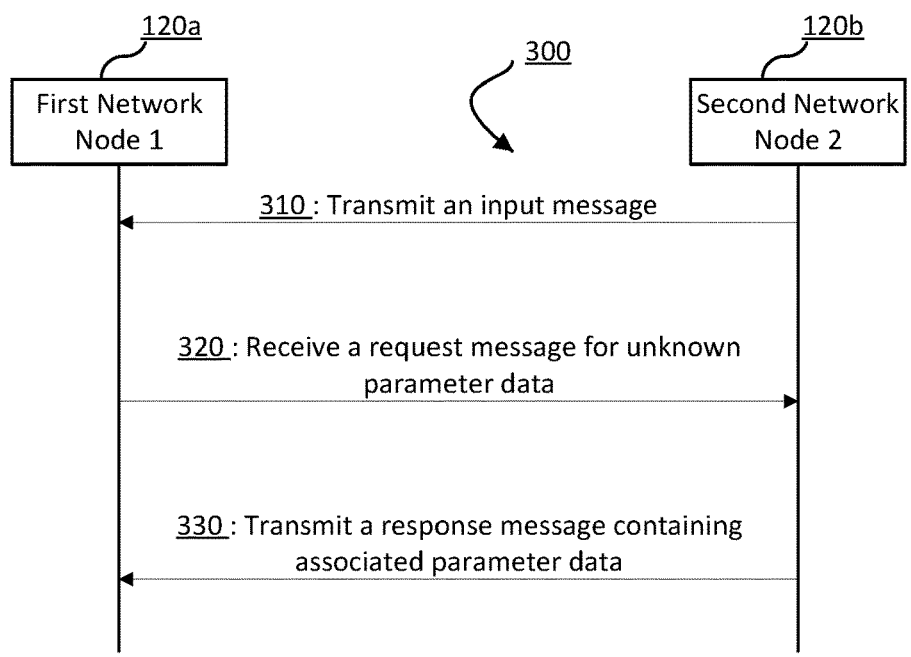
FIG. 3 is a schematic sequence diagram of a method for enhancing the message communication in a communication network with regard to the second network node in accordance to an embodiment of the invention

In FIG. 3, a schematic sequence diagram of a method 300 for enhancing the message communication in a communication network 110 with regard to the steps executed in the second network node 120b in accordance to an embodiment of the invention is illustrated. The method 300 implements the communication network 110, the first network node 120a and the second network node 120b described above with reference to FIG. 1

The method in FIG. 3 comprises the steps of the second network node 120b, transmitting 310 an input message to the first network node 120a wherein the input message contains at least one parameter. The method further comprises the second network node 120b receiving 320 a request message from the first network node 120a requesting meta-data associated with the parameter, wherein the parameter is unknown to the first network node 120a. After receiving the request message, the method further comprises, the second network node 120b transmitting 330 a response message to the first network node 120a wherein, the response message contains the requested meta-data associated with the parameter.

Each step of the method 300 shown in FIG. 3 will now be discussed in more detail. The method process starts at step 310, when the second network node 120b transmits an input message to the first network node 120a. The input message transmitted to the first network node 120a must contain at least one parameter. The input message transmitted may contain one or more parameters. The second network node 120b would be having the definition or meta-data associated with these parameter(s) in any of its data storage. But these parameter(s) may be unknown to the first network node 120a. The parameter(s) is unknown to the first network node 120a means the definition or meta-data of the parameter is not available in any data storage of the first network node 120a.

After transmitting the input message, the second network node 120b performs the step 320. At step 320, the second network node 120b receives a request message from the first network node 120a. The request message contains the request for obtaining from the data storage of the second network node 120b, the meta-data associated with the parameter, wherein the parameter is unknown to the first network node 120a. The request message received at the second network node 120b from the first network node 120a must contain at least one unknown parameter. The request message may contain one or more unknown parameters.

On receiving the request message, the second network node 120b processes the request message to identify the parameter(s) for which the meta-data is requested for. After identifying the parameter(s), it obtains the meta-data associated with the parameter(s) from the data storage. The second network node 120b then performs the step 330. At step 330, the second network node 120b transmits a response message to the first network node 120a. The response message transmitted to the first network node 120a contains the requested meta-data associated with the parameter(s). Thus, the second network node 120b facilitates in implementing the process of dynamic learning in the first network node 120a by providing the meta-data associated with parameter(s), wherein the parameter is unknown to the first network node 120a.

The message communication between the first 120a and second 120b network node in the communication network 110 is enhanced by implementing process of dynamic learning. The process of dynamic learning is implemented through the method 200 performed in the first network node 120a and the method 300 performed in the second network node 120b as described above.

The process of dynamic learning between the network nodes 120 in the communication network 110 provides the advantage of backward compatibility i.e. it does not impact in the current manner the network nodes 120 communicates with each other. The embodiments explained above shall exchange the dynamic learning information in an ongoing session or event and new messages need not be introduced specifically for this. The dynamic learning mechanism may be performed by introducing the parameters into new messages or via the existing messages sent between the network nodes 120 in the communication network 110.

Figure 4:
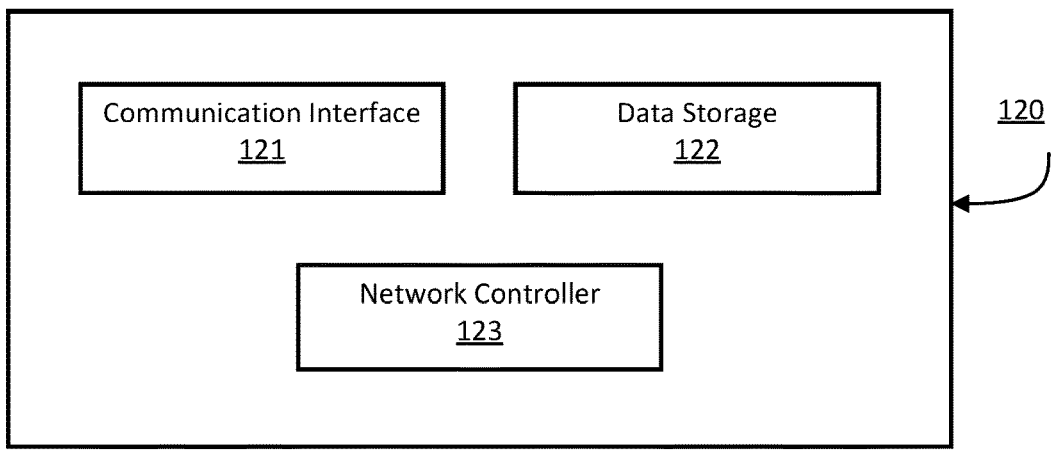
FIG. 4 is a schematic block diagram of a network node, in accordance to an embodiment of the invention.

In FIG. 4, a schematic block diagram of a network node 120 in accordance with an embodiment of the present invention is shown. The network node 120 is part of the communication network 110 as described above with reference to FIG. 1. The network node 120 (here exemplified with network node 120a) may comprise:

a communication interface 121 which is for facilitating the communication with another network node 120 (here exemplified with network node 120b) in the communication network 110;

a data storage 122 is typically a data file or a data source that contains the definition of the different information elements such as commands, AVPs etc. with corresponding definitions that are used in the messages sent and received between the network nodes 120a, 120b in a communication network 110. This data storage is typically used to validate and accept incoming request message or sent response messages, for the specific application; and, a network controller 123 is typically configured to perform the different network node 120 processing functions.

Figure 5:
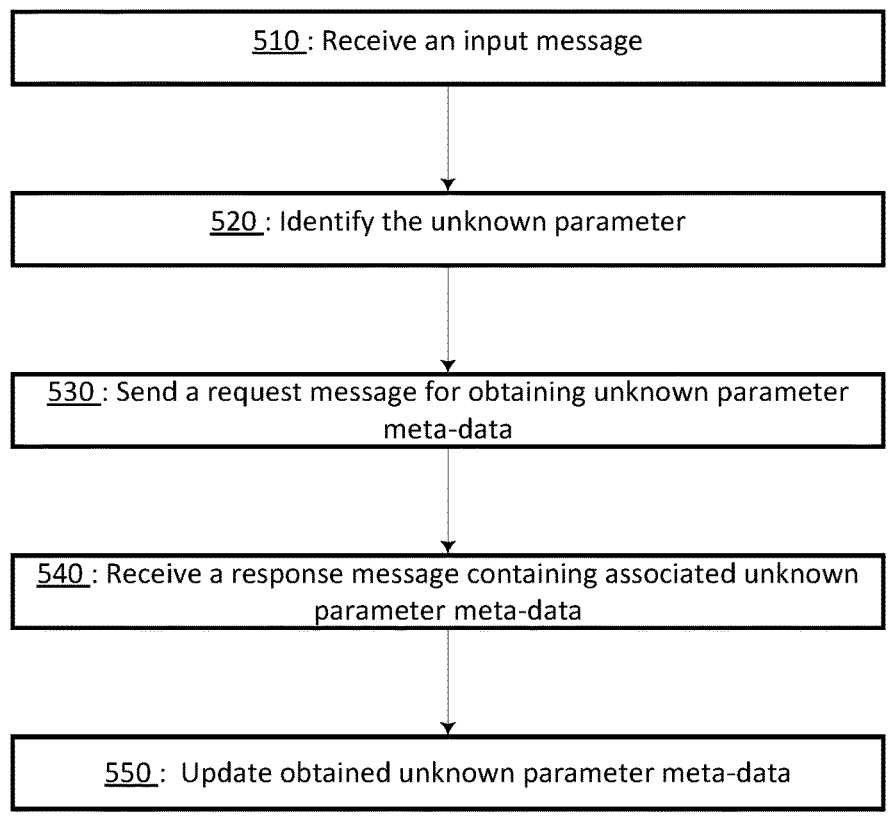
FIG. 5 is a schematic flowchart in accordance to an embodiment of the invention

In FIG. 5, a schematic flowchart of the processing steps performed by a first network node 120a for enhancing the message communication with a second network node 120b in accordance to an embodiment of the invention is shown. The first 120a and second 120b network node is part of the communication network 110 as described above with reference to FIG. 1. The first network node 120a and the second network node 120b may comprises a communication interface 121, a data storage 122 and a network controller 123 as described above with reference to FIG. 4.

The network controller 123 of the first network node 120a is configured to perform the different processing steps as shown in FIG. 5. The network controller 123 of the first network node 120a is configured to receive 510 an input message from the second network node 120b wherein the input message contains at least one parameter. The network controller 123 of the first network node 120a then identifies 520 in the received input message from the second network node 120b the presence of at least one parameter, wherein the parameter is unknown to the first network node 120a. After identifying the unknown parameter, the network controller 123 of the first network node 120a sends 530 a request message to the second network node 120b for obtaining meta-data associated with the identified unknown parameter. Then the network controller 123 of the first network node 120*a* receives 540 a response message from the second network node 120*b* containing the said meta-data associated with the identified unknown parameter. After receiving the response message, the network controller 123 of the first network node 120*a* then updates 550 the obtained meta-data associated with the unknown parameter.

Each processing step performed by the network controller 123 of the first network node 120*a* as shown in FIG. 5 will now be discussed in more detail. The processing starts when the network controller 123 of the first network node 120*a* receives 510 an input message from the second network node 120*b*. The input message received at the first network node 120*a* must contain at least one parameter. The input message received may contain one or more parameters. The parameter contained in the input message may comprise a parameter identifier and a parameter data. The parameter identifier associated with a parameter is used for identifying the parameter with a unique value across the different network nodes 120 in the network 110.

After receiving the input message from the second network node 120*b*, the network controller 123 of the first network node 120*a* processes the input message to identify the parameters contained in it. The network controller 123 of the first network node 120*a* identifies 520 in the received input message the presence of at least one parameter, wherein the parameter is unknown to the first network node 120*a*. The processing step of identifying the presence of at least one parameter further comprises the process of verifying that the parameter identifier of the parameter contained in the received input message is not present in the data storage 122 of the first network node 120*a*.

After identifying the unknown parameter, the network controller 123 of the first network node 120*a* sends 530 a request message to the second network node 120*b* for obtaining the meta-data associated with the identified unknown parameter. The network controller 123 of the first network node 120*a* sends a request message to the second network node 120*b* upon determining a status of a learning capability associated with the first network node 120*a* and the second network node 120*b*. The processing step of sending the request message is carried out by the network controller 123 of the first network node 120*a* when it has been determined that the status of the learning capability is enabled for both the first network node 120*a* and the second network node 120*b*.

The learning capability status of a network node 120*a*, 120*b* is typically set as Boolean value of true or false i.e. enabled or disabled state. It denotes whether the network node 120*a*, 120*b* supports the aspect of dynamic learning.

The request message sent by the network controller 123 of the first network node 120*a* to the second network node 120*b* may comprise the parameter identifier of the identified unknown parameter and a unique request message identifier. The request message may comprise of a single parameter identifier associated with a single unknown parameter or a list parameter identifiers associated with a list of unknown parameters. The request message identifier is used for uniquely identifying the request message type. When the second network node 120*b* receives the request message, the request message identifier helps the second network node 120*b* in identifying that the first network node 120*a* has sent a request for obtaining the meta-data associated with certain parameter(s) whose corresponding parameter identifier is provided with the request message.

After sending the request message, the network controller 123 of the first network node 120*a* receives 540 a response message from the second network node 120*b*. The response message contains the meta-data associated with the identified unknown parameter.

The response message received from the second network node 120*b* at the network controller 123 of the first network node 120*a* may comprise the parameter identifier and the meta-data associated with the identified unknown parameter which was contained in the request message sent to the second network node 120*b*; and a unique response message identifier. The response message may comprise of a single parameter identifier associated with a single unknown parameter and its corresponding meta-data or a list of parameter identifiers associated with a list of unknown parameters and its corresponding meta-data. The response message identifier is used for uniquely identifying the response message type.

After receiving the response message from the second network node 120*b*, the network controller 123 of the first network node 120*a* updates 550 the meta-data associated with the unknown parameter(s) which is obtained from the second network node 120*b* through the response message which is received at the first network node 120*a* from the second network node 120*b*. The processing step of updating the obtained meta-data associated with the unknown parameter further comprises the process of identifying the response message identifier, then identifying the parameter identifier and the obtained meta-data associated with the unknown parameter contained in the received response message; and updating the obtained meta-data associated with the identified unknown parameter(s) in the data storage 122 of the first network node 120*a*. So, after the updating the obtained meta-data associated with the identified unknown parameter(s) in the data storage 122, the first network node 120*a* would be capable of processing any input message containing these unknown parameter(s) in the future.

The message communication between the first network node 120*a* and the second network node 120*b* in the communication network 110 is typically via a diameter protocol.

According to an embodiment of the present invention, a system for enhancing message communication between a first network node 120*a* and a second network node 120*b* is provided. The first network node 120*a* and a second network node 120*b* is part of the communication network 110 as described above with reference to FIG. 1. The environment 100 shown in FIG. 1 is suitable for implementing the system which will be explained in more detail below. The system is configured to perform the steps as stated. The second network node 120*b* transmits an input message to the first network node 120*a* wherein the input message contains at least one parameter. The first network node 120*a* then identifies in the received input message the presence of the at least one parameter, wherein the parameter is unknown to the first network node 120*a*. After identifying at least one unknown parameter, the first network node 120*a* sends a request message to the second network node 120*b* for obtaining meta-data associated with the identified unknown parameter. The second network node 120*b* then transmits a response message to the first network node 120*a* wherein, the response message contains the said requested meta-data associated with the unknown parameter. After receiving the response message from the second network node 120*b*, the first network node 120*a* updates the obtained meta-data associated with the unknown parameter in the data storage. The first network node 120*a* and the second network node 120*b* may comprises a communication interface 121, a data storage 122 and a network controller 123 as described above with reference to FIG. 4.

As already mentioned, in a 3GPP network, the network nodes typically communicate using Diameter protocol. There would be several diameter nodes over the 3GPP network for realizing a communication service.

Figure 6:
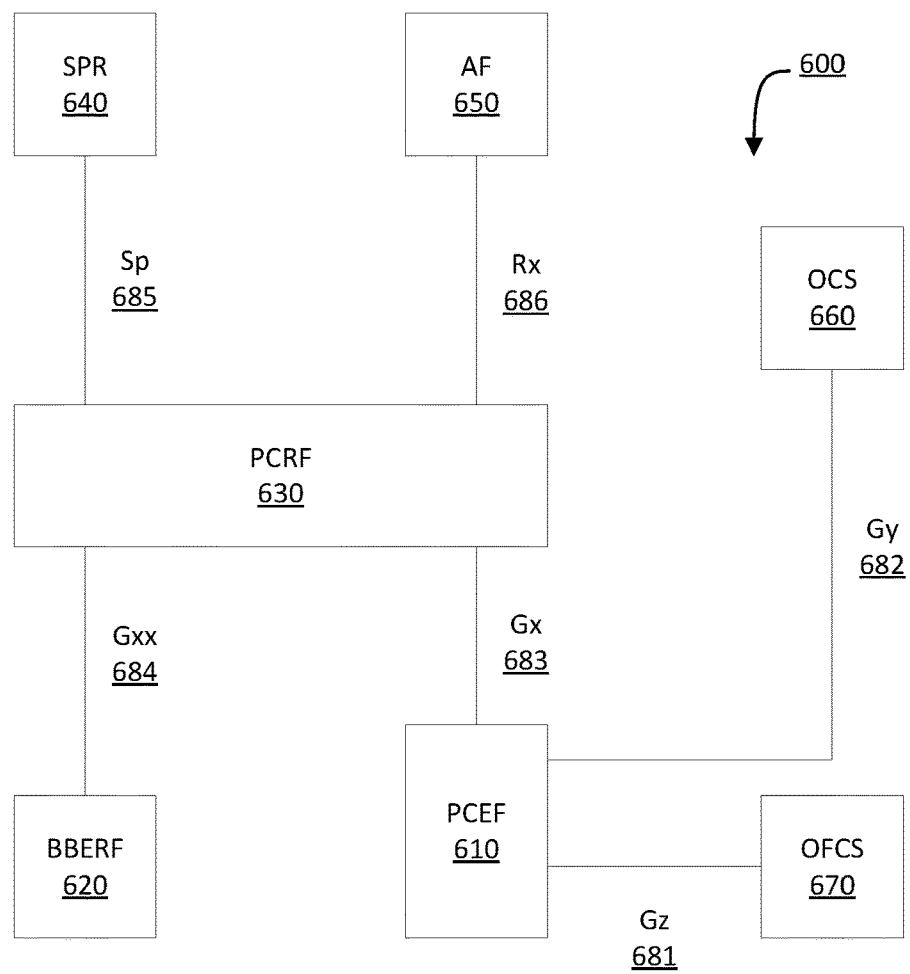
FIG. 6 is a schematic illustration of a 3GPP network environment where the embodiments presented herein may be applied.

In FIG. 6, a schematic illustration of a 3GPP network environment 600 in which the embodiments presented herein may be applied is shown. The 3GPP network environment 600 shown in FIG. 6 provides a sample illustration of the implementation of the communication network environment 100 explained above with reference to FIG. 1. The 3GPP network environment 600 illustrates the different network nodes 120 in a 3GPP network 600 which communicate with each other using Diameter protocol. The different applications shown in the 3GPP network 600 such as a Policy & Charging Rules Function (PCRF) 630, an Online Charging System (OCS) 660, a Policy & Charging Enforcement Function (PCEF) 610, an Application Function (AF) 650, an Offline Charging System (OFCS) 670, a Bearer Binding and Event Reporting Function (BBERF) 620, Subscription Profile Repository (SPR) 640 etc., corresponds to the different network nodes 120 in the communication network 110. These applications are used for realizing a service in the 3GPP communication network 600. These applications 600 communicate with each other using Diameter protocol. PCRF 630 communicates with AF 650 via the 3GPP-standard-defined Rx interface 686. PCRF 630 communicates with a PCEF 610 via 3GPP-standard-defined Gx interface 683. PCRF 630 communicates with a BBERF 620 via 3GPP-standard-defined Gxx interface 684. PCRF 630 communicates with a SPR 640 via 3GPP-standard-defined Sp interface 685. PCEF 610 communicates with an OCS 660 via 3GPP-standard-defined Gy interface 682. PCEF 610 communicates with an OFCS 670 via 3GPP-standard-defined Gz interface 681. The Sp 685, Rx 686, Gx 683, Gy 682, Gz 681 and Gxx 684 Diameter interfaces are defined by 3GPP Technical Specifications (TS) standards respectively. For Diameter messaging, the interfaces Sp 685, Rx 686, Gx 683, Gy 682, Gz 681 and Gxx 684 are referred to as applications.

Using the 3GPP network environment 600 illustrated in FIG. 6 along with reference to the network environment 100 (as shown in FIG. 1 and explained above) and the network node 120 (as shown in FIG. 4 and explained above), an example of an implementation of the above methods 200, 300 will now be described.

The different applications shown in the 3GPP network 600 which is implemented as a network node 120 in the communication network 110 (as described above with reference to FIG. 1) may comprise a communication interface 121, a data storage 122 and a network controller 123 (as described above with reference to FIG. 4.)

The PCRF node 630 shown in FIG. 6 typically needs to interact with multiple network nodes (SPR 640, AF 650, BBERF 620, PCEF 610 etc.) in the network 600, many of which could be from various vendors. So, the commands and AVPs that are used in the Diameter messages sent and received between the PCRF 630 and the multiple network nodes (SPR 640, AF 650, BBERF 620, PCF 610 etc.) may have definitions which could be standard specific or application vendor specific. These information element definitions are stored in the data storage 120 or dictionary of each network node (PCRF 630, SPR 640, AF 650, BBERF 620, PCEF 610 etc.). So, if the PCRF 630 needs to interface with the SPR 640 in the network 600, then the PCRF node 630 and SPR 640 must have all the relevant standard and vendor specific information element definitions in its data storage for it to accept and process the Diameter messages that are received and sent between the PCRF node 630 and SPR 640.

For example let us consider the scenario wherein, the PCEF 610 needs to interface with the OCS 660 in the network 600. The OCS 660 sends a CER to PCEF 610. The PCEF then responds with a CEA to OCS 660. The connection is then ready for exchanging Diameter messages between the Diameter nodes PCEF 610 and OCS 660. AVPs are the basic units inside the Diameter message that carries the data where AVP corresponds to the parameter. There must be at least one AVP inside the Diameter message. Typically an AVP comprises:

Avp-Vendor-Id: Vendor Specific Identification. For 3GPP, it is 10415 and the default value is 0.

Avp-Code: The Unique identification along with the Vendor-Id to indicate the parameter.

Avp-Flag:
  Mandatory Bit: If set, Indicates this AVP should be supported by the Diameter Nodes.
  Vendor-Id Bit: If Set, indicates the AVP contains the Vendor-Id populated.
  Protected Bit: If set then the AVP data is encrypted for End-to End Security.

Avp-Length: This indicates the length including the Data, Vendor-Id, AVP Code and AVP Flags.

Data: This is of zero or more Octets and contains the information/value for the parameter represented for the AVP-Code. The data in the AVP may contain again the set of AVP/AVPs and is called as Grouped AVPs.

Typically, the Avp-Code and Avp-Vendor-Id of an AVP together as a combination attribute value is used for uniquely identifying an AVP across the different diameter nodes in the network 600. Here after the Avp-Code and Avp-Vendor-Id combination value of an AVP would be referred as 'Avp-Identifier' which corresponds to the parameter identifier. A sample illustration of an input Diameter message transmitted and an AVP contained in it is given below.

Illustration of the Diameter input message:
  Flags: 0x80, Request
  Command Code: 272 Credit-Control
  ApplicationId: Diameter Credit Control Application (4)
  Hop-by-Hop Identifier: 0x0d7d0453
  End-to-End Identifier: 0x50f00002
  AVP: Session-Id(263) l=21 f=-M- val=1473400084730
  AVP: Auth-Application-Id(258) l=12 f=-M- val=Diameter Credit Control Application (4)
  AVP: Destination-Realm(283) l=25 f=-M- val=node2.ericsson.se
  AVP: Destination-Host(293) l=31 f=-M- val=aaa://100.97.72.76:3868
  AVP: Origin-Host(264) l=21 f=-M- val=100.97.73.197
  AVP: Origin-Realm(296) l=25 f=-M- val=node1.ericsson.se
  AVP: Unknown(XX01) l=y f=V--vnd-id=Z01 val=0x646566

Illustration of a single AVP in the above Diameter input message:
  AVP: Session-Id(263) l=21 f=-M- val=1473400084730
  Avp-Code: 263 Session-Id
  Avp-Flags: 0x40
    0 . . . =Vendor-Specific: Not set
    . . . 1 . . . =Mandatory: Set

```
. . . 0 . . . =Protected: Not set
. . . 0 . . . =Reserved: Not set
. . . 0 . . . =Reserved: Not set
. . . 0 . . . =Reserved: Not set
. . . 0 . . . =Reserved: Not set
    . . . 0 . . . =Reserved: Not set
```
  Avp-Length: 21
  Session-Id: 1473400084730
  Padding: 00

The OCS 660 transmits an input message to the PCEF 610. The input message transmitted to the PCEF 610 may contain one or more AVPs. The OCS 660 would be having the definition or meta-data associated with these AVP(s) in its data storage 122. But these AVPs(s) may be unknown to the PCEF 610. An AVP(s) is unknown to the PCEF 610 means the definition or meta-data of the AVP is not available in the data storage 122 of the PCEF 610. A sample illustration of an input message transmitted from OCS 660 to PCEF 610 is given below.

Illustration of a sample input message transmitted from OCS 660 to PCEF 610:

```
<Diameter Header>
...
AVP: Origin-Realm(296) l=25 f=-M- val=node1.ericsson.se
AVP: Unknown(XZ01) l=y f=V-- vnd-id=Z01 val=0x646566
...
</Diameter Header>
```

</Diameter Header>

Here, in the input message received containing the unknown AVP, 'XZ01' is the

Avp-Code and 'Z01' is the Avp-Vendor-Id of the unknown AVP.

On receiving the input message from OCS 660, the input message is processed by PCEF 610 to identify the AVP(s) contained in it. The PCEF 610 then identifies the AVP(s) which is unknown to it. The PCEF 610 identifies an unknown AVP(s) by verifying that the Avp-Identifier of the AVP(s) contained in the received input message is not present in its corresponding data storage 122. In the above sample input message received at PCEF 610 from OCS 660, the AVP with code=XZ01 and vendor-id=Z01 is unknown to the PCEF 610

After identifying the unknown AVP(s), the PCEF 610 sends a request message to the OCS 660 for obtaining the meta-data associated with the identified unknown AVP. A request message is send to the OCS 660 from the PCEF 610 upon determining the learning capability status associated with the PCEF 610 and the OCS 660. The request message is sent from the PCEF 610 to the OCS 660 if, the learning capability status is enabled for both the PCEF 610 and the OCS 660.

The learning capability status of the PCEF 610 and the OCS 660 is typically set as an attribute of Boolean type with value true or false i.e. enabled or disabled state. It denotes whether the PCEF 610 and the OCS 660 supports the aspect of dynamic learning. The learning capability status value for the PCEF 610 and the OCS 660 would be set either manually or automatically as per the specifications defined by the vendor providing the PCEF 610 and the OCS 660.

When the PCEF 610 identifies an unknown AVP(s) in the input message received from the OCS 660 then the PCEF 610 can reject the input message completely or process the input message partially by omitting this unknown AVP(s) or try to obtain i.e. learn the meta-data associated with the unknown AVP(s) for processing the input message. The process of rejecting the input message or partially processing by omitting or learning the meta-data is done based on the learning capability status value of PCEF 610. Since the input message is received from the OCS 660, typically the OCS 660 would be having the meta-data associated with the identified unknown AVP(s). So, when the OCS 660 receives a request message from the PCEF 610 for obtaining the meta-data associated with the identified AVP(s) then the OCS 660 would ignoring the request message, not provide the requested meta-data or process the request message, provide the requested meta-data to the PCEF 610. The process of rejecting the request or providing the requested meta-data is done based on the learning capability status value of the OCS 660. The table given below shows what process is performed by the PCEF 610 and OCS 660 based the status of the learning capability.

| Learning Capability Status of PCEF | Learning Capability Status of OCS | Process performed by PCF | Process performed by OCS |
|---|---|---|---|
| Enabled | Enabled | Learn, send request to obtain the meta-data | Process, provide the requested meta-data |
| Enabled | Disabled | Reject input message or partially process by omitting | Ignore, not provide the meta-data |
| Disabled | Enabled | Reject input message or partially process by omitting | Ignore, not provide the meta-data |
| Disabled | Disabled | Reject input message or partially process by omitting | Ignore, not provide the meta-data |

The request message sent from the PCEF 610 to the OCS 660 may comprise the Avp-Identifier of the identified unknown AVP(s) and a unique request message identifier. The request message may comprise of a single Avp-Identifier associated with a single unknown AVP or a list Avp-Identifiers' associated with a list of unknown AVPs. The request message identifier is used for uniquely identifying the request message type. When the OCS 660 receives the request message, the request message identifier helps the OCS 660 in identifying that the PCEF 610 has sent a request for obtaining the meta-data associated with certain AVP(s). A sample structure and illustration of a Diameter request message sent from the PCEF 610 to the OCS 660 is given below.

Structure of a Diameter request message sent for requesting the unknown parameter meta-data:

Diameter Message:

```
< Diameter Header >
    ....
       *[AVP Diameter-Learning-Request (AVP Code:XX01,
    vendor-Id=Y01) ]
    ...
    AVP Diameter-Learning-Request::= < AVP Header: XX01,
    vendor-Id=Y01,
    Grouped>
            { Avp-Code XY01, vendor-Id=Y01 }
            { Avp-vendor-Id XY02, vendor-Id=Y01 }
    </Diameter Header >
```

In the above structure

{ } indicates mandatory

[ ] indicates optional

*[ ] 0 or more occurrence.

'XX01' is the unique request message identifier used for identifying the request message which is sent for retrieving the unknown parameter meta-data. 'XY01' is the AVP representing the Avp-Code and 'XY02' is the AVP representing the Avp-Vendor-Id of the unknown AVP received in the input message.

Illustration of a sample request message sent from PCEF 610 to OCS 660:
Diameter Message

```
<Diameter Header>
    ...
    AVP: Session-Id(263) l=21 f=-M- val=1473400084730
    AVP: Diameter-Learning-Request (XX01) l=y f=V-- Grouped
    AVP: Avp-Code (XY01) l=y f=V-- vendor-Id=Y01
val=XZ01
    AVP: Avp-Vendor-Id (XY02) l=y f=V-- vendor-
Id=Y01 val=Z01
    ....
</Diameter Header >
```

Here, in the above request message sent from PCEF 610 to OCS 660 'XX01' is the unique request message identifier used for identifying the request message type; 'XZ01' is the Avp-Code and 'Z01' is the Avp-Vendor-Id of the unknown AVP.

On receiving the request message from PCEF 610, the OCS 660 processes the request message to identify the AVP(s) for which the meta-data is requested for. After identifying the AVP(s), it obtains the meta-data associated with the AVP (s) from its data storage 122. The OCS 660 then transmits a response message to the PCEF 610 which contains the requested meta-data associated with the AVP(s). The response message sent to the PCEF 610 from the OCS 660 may comprise the Avp-Identifier and the meta-data associated with the identified unknown AVP(s) which was contained in the request message sent to the OCS 660 from the PCEF 610 and a unique response message identifier. The response message may comprise a single Avp-Identifier associated with a single unknown AVP and its corresponding meta-data or list of Avp-Identifier associated with a list of unknown AVPs and its corresponding meta-data. The response message identifier is used for uniquely identifying the response message type. When the PCEF 610 receives the response message, the response message identifier helps the PCEF 610 to identify that the OCS 660 has sent a response containing the meta-data associated with the identified unknown AVP(s). A sample structure and illustration of a Diameter response message received at OCS 660 from PCEF 610 is given below.

Structure of a Diameter response message received containing the associated unknown parameter meta-data:
Diameter Message

```
<Diameter Header>
    AVP Diameter-Learning-Response ::= < AVP Header: XX02,
vendor-Id=Y01 >
    { Avp-Code XY01, vendor-Id=Y01 }
    { Avp-vendor-Id XY02, vendor-Id=Y01 }
    { Avp-Name XY03, vendor-Id=Y01 }
    [ Avp-Description XY04, vendor-Id=Y01 ]
    { Avp-DataType XY05, vendor-Id=Y01 }
    [ Avp-Enumerated XY06, vendor-Id=Y01 ]
    [ Avp-OctetGrammer XY07, vendor-Id=Y01 ]
    [ Avp-Flags XY08, vendor-Id=Y01 ]
    Avp-Enumerated ::= < AVP Header: XY03, vendor-Id=Y01 >
        *[Avp-Enum-Value XY09, vendor-Id=Y01 ]
```

-continued

```
        *[Avp-Enum-Description XY10, vendor-Id=Y01 ]
</Diameter Header>
```

In the above structure
{ } indicates mandatory
[ ] indicates optional
*[ ] 0 or more occurrence.

'XX02' is the unique response message identifier used for identifying the response message which is received containing the associated unknown parameter meta-data. 'XY01-XY10' are the AVPs representing the meta-data such as code, type, name, vendor-id, enumerated, flags etc. of the unknown AVP.

Illustration of a sample response message received at OCS 660 from PCEF 610:
Diameter Message

```
<Diameter Header>
    ...
    {AVP: Session-Id(263) l=21 f=-M- val= 1473400084730
    AVP: Diameter-Learning-Response (XX02) l=y f=V-- Grouped
        AVP: Avp-Code (XY01) l=y f=V-- vendor-Id=Y01 val=XZ01
        AVP: Avp-Vendor-Id (XY02) l=y f=V-- vendor-
Id=Y01 val=Z01
        AVP:Avp-Name (XY03) l=y f=V-- vendor-
Id=Y01 val=VendorUsername
        AVP:Avp-DataType (XY04) l=y f=V-- vendor-
Id=Y01 val=UTF8String
    ...
</Diameter Header>
```

Here, in the above response message received at OCS 660 from PCEF 610 XX02 is the unique response message identifier used for identifying the response message type; 'XZ01' is the Avp-Code, 'Z01' is the Avp-Vendor-Id, 'VendorUsername' is the Avp-Name and 'UTF8String' is the Avp-DataType which constitutes the meta-data of the unknown AVP.

On receiving the response message from OCS 660, the response message is processed by PCEF 610 to identify the Avp-Identifier and the obtained meta-data associated with the unknown AVP(s) contained in the response message. Then, the identified meta-data associated with the unknown AVP(s) is updated in the data storage 122 of the PCEF 610. So, after the updating the obtained meta-data associated with the identified unknown AVP(s) in the data storage 122, the PCEF 610 would be capable of processing any input message containing these unknown AVP(s) in the future. Thus, the OCS 660 also facilitates in implementing the process of dynamic learning in the PCEF 610 by providing the meta-data associated with unknown AVP(s). A sample illustration of the AVP meta-data updated in the data storage 122 of the PCEF 610 is given below.

Illustration of a AVP meta-data updated in the data storage 122 of the PCEF 610:
<AVP_Def name="VendorUsername" code="XZ01" type="UTF8String" vendorId="Z01"/>

The present invention can be applied for any Diameter based application/interface. By introducing the dynamic learning in a Diameter node the integration lead time can be greatly reduced, for diameter based interface updates; with ease of introducing new diameter information elements over the interface. It also facilitates in providing a flexible Diameter Network with less or no interface upgrade costs. The invention provides a mechanism to enhance RFC 6733 capability for exchanging the definition of vendor specific AVP between Diameter Systems.

Figure 7:
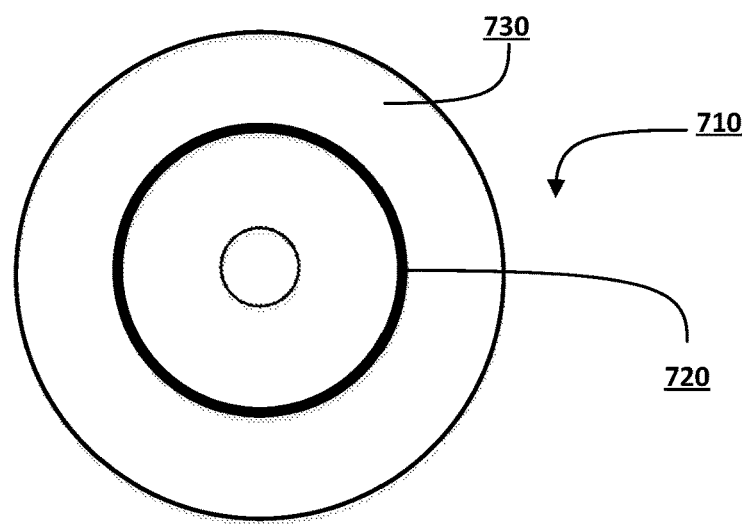
FIG. 7 is a schematic illustration of an embodiment of a computer program product in accordance with the invention.

In FIG. 7, a schematic illustration of an embodiment of a computer program product is illustrated. It shows one example of a computer program product 710 comprising computer readable storage medium 730. On this computer readable storage medium 730, a computer program 720 can be stored, which computer program 720 can cause the network node 120 and thereto operatively coupled entities and devices, such as the network controller 123, to execute methods according to the invention described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The invention has mainly been described above with reference to a few embodiments. However, as is readily appreciated by a person skilled in the art, other embodiments than the ones disclosed above are equally possible within the scope of the inventive concept, as defined by the appended patent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

The invention claimed is:

1. A method for enhancing message communication between a first and a second network node in a communication network, the method being executed at the first network node and comprising:
   receiving an input message from the second network node wherein the input message contains at least one parameter;
   identifying in the received input message the presence of the at least one parameter, wherein the parameter is unknown to the first network node;
   sending a request message to the second network node for obtaining meta-data associated with the identified unknown parameter;
   receiving a response message containing said meta-data associated with the identified unknown parameter from the second network node; and
   updating the obtained meta-data associated with the identified unknown parameter in a data storage of the first network node, wherein after the updating of the obtained meta-data associated with the identified unknown parameter in the data storage, the first network node is capable of processing the input message and any future input message comprising the identified unknown parameter.

2. The method according to claim 1, wherein the request message is sent to the second network node upon determining a status of a learning capability associated with the first network node and the second network node.

3. The method according to claim 1, wherein sending the request message is carried out when it has been determined that the status of the learning capability is enabled for both the first network node and the second network node.

4. The according to claim 1, wherein the parameter further comprising:
   a parameter identifier, which identifies the parameter with a unique value; and
   a parameter data.

5. The method according to claim 1, wherein identifying presence of at least one parameter further comprising verifying that the parameter identifier of the parameter contained in the received input message is not present in any data storage of the first network node.

6. The method according to claim 1, wherein the sent request message, further comprising:
   the parameter identifier of the identified unknown parameter; and
   a unique request message identifier, for identifying the request message type.

7. The method according to claim 1, wherein the received response message, further comprising:
   the parameter identifier and the obtained meta-data associated with the identified unknown parameter contained in the request message; and
   a unique response message identifier, for identifying the response message type.

8. The method according to claim 1, wherein updating the obtained meta-data associated with the unknown parameter comprises:
   identifying the response message identifier;
   identifying the parameter identifier and the obtained meta-data associated with the identified unknown parameter contained in the received response message; and
   updating the obtained meta-data associated with the identified unknown parameter in the data storage of the first network node.

9. The method according to claim 1, wherein the message communication between the first and the second network node in the communication network is via a diameter protocol.

10. A first network node configured for enhancing message communication with a second network node in a communication network, the first network node comprising:
    a communication interface for communicating with the second network node in the communication network;
    a data storage; and
    a network controller configured to:
       receive an input message from the second network node wherein the input message contains at least one parameter;
       identify in the received input message the presence of at least one parameter, wherein the parameter is unknown to the first network node;

send a request message to the second network node for obtaining meta-data associated with the identified unknown parameter;

receive, a response message containing said meta-data associated with the identified unknown parameter from the second network node; and update the obtained meta-data associated with the identified unknown parameter in the data storage of the first network node, wherein after the update of the obtained meta-data associated with the identified unknown parameter in the data storage, the first network node is capable of processing the input message and any future input message comprising the identified unknown parameter.

11. The first network node of claim 10, wherein to send the request message to the second network node, the network controller is further configured to send the request message upon determining a status of a learning capability associated with the first network node and the second network node.

12. The first network node according to claim 10, wherein to send the request message, the network controller is further configured to carry out the sending of the request message when it has been determined that the status of the learning capability is enabled for both the first network node and the second network node.

13. The first network node according to claim 10, wherein the network controller is further configured to define the parameter, wherein the parameter further comprises:
   a parameter identifier, which identifies the parameter with a unique value; and
   a parameter data.

14. The first network node according to claim 10, wherein to identify presence of the at least one parameter, the network controller is further configured to verify that the parameter identifier of the parameter contained in the received input message is not present in any data storage of the first network node.

15. The first network node according to claim 10, wherein the network controller is further configured to define the sent request message, wherein the request message further comprising:
   the parameter identifier of the identified unknown parameter; and
   a unique request message identifier, for identifying the request message type.

16. The first network node according to claim 10, wherein the network controller is further configured to define the received response message, wherein the response message further comprising:
   the parameter identifier and the obtained meta-data associated with the identified unknown parameter contained in the request message; and
   a unique response message identifier, for identifying the response message type.

17. The first network node according to claim 10, wherein to update the obtained meta-data associated with the unknown parameter, the network controller is further configured to:

identify the response message identifier;

identify the parameter identifier and the obtained meta-data associated with the identified unknown parameter contained in the received response message; and update the obtained meta-data associated with the identified unknown parameter in the data storage of the first network node.

18. The first network node according to claim 10, wherein the message communication between the first and the second network node in the communication network is via a diameter protocol.

19. A method for enhancing message communication between a first and a second network node in a communication network, the method being executed at the second network node comprising:

transmitting an input message to the first network node wherein the input message contains at least one parameter;

receiving a request message from the first network node requesting meta-data associated with the parameter, wherein the parameter is unknown to the first network node; and transmitting, a response message to the first network node wherein, the response message containing said requested meta-data associated with the unknown parameter, wherein the first network node is capable of processing the input message and any future input message containing the unknown parameter after updating said requested meta-data associated with the unknown parameter in a data storage of the first network node.

20. A system for enhancing message communication between a first and a second network node in a communication network, the system is configured to:

transmit an input message to the first network node from the second network node wherein the input message contains at least one parameter;

identify by the first network node, in the received input message the presence of at least one parameter, wherein the parameter is unknown to the first network node;

send a request message from the first network node to the second network node for obtaining meta-data associated with the identified unknown parameter;

transmit, a response message to the first network node from the second network node, wherein the response message is containing the said requested meta-data associated with the identified unknown parameter; and update the obtained meta-data associated with the identified unknown parameter in the first network node, wherein after the update of the obtained meta-data associated with the identified unknown parameter in the data storage, the first network node is capable of processing the input message any future input message containing the identified unknown parameter.

* * * * *